(12) United States Patent
Chhillar et al.

(10) Patent No.: US 9,800,522 B2
(45) Date of Patent: Oct. 24, 2017

(54) MAKE-BEFORE-BREAK SYSTEMS AND METHODS DECOUPLING A CONTROL PLANE FROM A DATA PLANE

(71) Applicants: Mohit Chhillar, Pitam Pura (IN); Anurag Prakash, Noida (IN); Gerard Leo Swinkels, Ottawa (CA)

(72) Inventors: Mohit Chhillar, Pitam Pura (IN); Anurag Prakash, Noida (IN); Gerard Leo Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 254 days.

(21) Appl. No.: 14/554,115

(22) Filed: Nov. 26, 2014

(65) Prior Publication Data

US 2016/0105380 A1    Apr. 14, 2016

(30) Foreign Application Priority Data

Oct. 13, 2014  (IN) ............... 2940/DEL/2014

(51) Int. Cl.
| | | |
|---|---|---|
| *H04L 12/939* | (2013.01) | |
| *H04L 12/911* | (2013.01) | |
| *H04L 12/703* | (2013.01) | |
| *H04L 12/937* | (2013.01) | |
| *H04L 12/715* | (2013.01) | |
| *H04L 12/707* | (2013.01) | |

(52) U.S. Cl.
CPC ............ *H04L 49/557* (2013.01); *H04L 45/28* (2013.01); *H04L 47/72* (2013.01); *H04L 45/22* (2013.01); *H04L 45/64* (2013.01); *H04L 49/253* (2013.01)

(58) Field of Classification Search
CPC ....... H04L 49/557; H04L 45/28; H04L 47/72; H04L 45/22; H04L 45/64; H04L 49/25
USPC .......................... 370/216, 217, 352
See application file for complete search history.

(56) References Cited

U.S. PATENT DOCUMENTS

| | | | |
|---|---|---|---|
| 4,345,116 A * | 8/1982 | Ash .................. | H04Q 3/66 379/112.05 |
| 7,287,081 B1 * | 10/2007 | Deboer ............... | H04L 41/0663 370/217 |
| 7,417,950 B2 | 8/2008 | Hofmeister et al. | |
| 7,835,267 B2 | 11/2010 | Zamfir et al. | |
| 8,402,121 B2 | 3/2013 | Skalecki et al. | |
| 8,509,618 B2 | 8/2013 | Boertjes et al. | |
| 8,666,247 B2 | 3/2014 | Srinivasan et al. | |
| 8,682,160 B2 | 3/2014 | Prakash et al. | |

(Continued)

FOREIGN PATENT DOCUMENTS

WO     2013127472 A1    9/2013

*Primary Examiner* — Melvin Marcelo
*Assistant Examiner* — Natali N Pascual Peguero
(74) *Attorney, Agent, or Firm* — Clements Bernard Walker PLLC; Christopher L. Bernard; Lawrence A. Baratta, Jr.

(57) ABSTRACT

A Make-Before-Break (MBB) method, in a node operating in a network with a control plane, decoupling the control plane from a data plane, includes, for a connection operating on a path in the network, determining a reserved connection on a new path, through the control plane, wherein the reserved connection has zero bandwidth; signaling the reserved connection on the new path; creating the reserved connection in the control plane while suspending implementation in the data plane due to the zero bandwidth; and releasing the connection on the path and modifying the reserved connection on the new path to establish the connection on the new path.

16 Claims, 13 Drawing Sheets

(56) References Cited

U.S. PATENT DOCUMENTS

| | | |
|---|---|---|
| 8,718,471 B2 | 5/2014 | Prakash et al. |
| 8,750,706 B2 | 6/2014 | Boertjes et al. |
| 2005/0069333 A1* | 3/2005 | Moeller ................ H04B 10/64 398/202 |
| 2011/0075549 A1* | 3/2011 | Lu ....................... G06F 11/1415 370/216 |
| 2011/0222862 A1 | 9/2011 | Boertjes et al. |
| 2013/0177305 A1 | 7/2013 | Prakash et al. |
| 2013/0242721 A1* | 9/2013 | Moynihan ........... H04L 41/0672 370/225 |
| 2013/0308948 A1 | 11/2013 | Swinkels et al. |
| 2014/0126899 A1 | 5/2014 | Prakash et al. |
| 2014/0147107 A1 | 5/2014 | Swinkels et al. |
| 2014/0205278 A1 | 7/2014 | Kakkar et al. |

* cited by examiner

MAKE-BEFORE-BREAK SYSTEMS AND METHODS DECOUPLING A CONTROL PLANE FROM A DATA PLANE

CROSS-REFERENCE TO RELATED APPLICATION(S)

The present patent application/patent claims the benefit of priority of Indian Patent Application No. 2940/DEL/2014, filed on Oct. 13, 2014, and entitled "MAKE-BEFORE-BREAK SYSTEMS AND METHODS DECOUPLING A CONTROL PLANE FROM A DATA PLANE," the contents of which are incorporated in full by reference herein.

FIELD OF THE DISCLOSURE

The present disclosure relates generally to networking systems and methods. More particularly, the present disclosure relates to Make-Before-Break (MBB) systems and methods which decouple a control plane from a data plane.

BACKGROUND OF THE DISCLOSURE

In a control plane network, network connections can be moved either using Break-Before-Make (BBM) (e.g. delete and add) or Make-Before-Break (MBB) (e.g. bridge and roll). MBB is preferred as it reduces the outage time and reduces operational corner cases. MBB relies on a fabric (data plane) that can bi-cast (multicast) and select. If the fabric cannot support bridge and select capabilities (i.e., a unicast fabric), then the MBB function cannot be used. This leads to a removal of the MBB functions and therefore opening the control plane to more corner case conditions (e.g. transaction rollback that results in a data plane outage). The MBB function is also required for various other important applications, such as Retain Home Path (RHP) where resources are reserved on the home path while a connection is not on all or part of the home path, Time of Day Reversion (ToDR), co-routed Subnetwork Connections (SNCs), Manual Switch to Protect (MSP), Revert, regenerator maintenance activity, amplifier site insertion, and the like.

A single node not capable of performing MBB operations prevents others from using MBB operations, on an associated connection. Also, MBB is a very difficult proposition to implement in photonic networks. Even the theoretical implementation is very costly and would lead to a limitation in other Layer 0 and optical functionalities. Thus, there is a need for MBB systems and methods with a unicast fabric in control plane networks.

BRIEF SUMMARY OF THE DISCLOSURE

In an exemplary embodiment, a Make-Before-Break (MBB) method, in a node operating in a network with a control plane, decoupling the control plane from a data plane, includes, for a connection operating on a path in the network, determining a reserved connection on a new path, through the control plane, wherein the reserved connection has zero bandwidth; signaling the reserved connection on the new path; and creating the reserved connection in the control plane while suspending implementation in the data plane due to the zero bandwidth. The MBB method can further include releasing the connection on the path and modifying the reserved connection on the new path to establish the connection on the new path. The MBB method can further include, responsive to a failure affecting the connection, releasing the connection on the path and modifying the reserved connection on the new path to switch the connection to the new path which is a protect path. Setting up a working path on any portion of the new path can preempt the reserved connection. The reserved connection can be one of a Zero Bandwidth Subnetwork Connection (SNC) and/or an unconstrained Label Switched Path (LSP). The node can utilizes a unicast switch fabric that is unable or unwilling to support broadcast and select. The node can be unable or unwilling to support broadcast and select with a wavelength. The signaling the new path can support overbooking for the reserved connection and one or more additional reserved connections with a first connection of the reserved connection and the one or more additional reserved connection converting to active occupying the new path. The signaling the reserved connection can indicate a plurality of parameters including whether the reserved connection is blocking or non-blocking. The reserved connection can be blocking and preempts any existing reserved connections on the new path. The reserved connection can be non-blocking and can be crank-backed in the creating responsive to a blocking reserved connection on a portion or all of the new path.

In another exemplary embodiment, a node, operating in a network with a control plane, configured to perform Make-Before-Break (MBB) where the control plane is decoupled from the data plane, includes one or more ports configured for switching between one another; and a controller communicatively coupled to the one or more ports, wherein the controller is configured to, for a connection operating on a path in the network, determine a reserved connection on a new path, through the control plane, wherein the reserved connection has zero bandwidth, signal the reserved connection on the new path, and cause creation of the reserved connection in the control plane while suspending implementation in the data plane due to the zero bandwidth. The controller can be further configured to perform one of: responsive to a request, cause release of the connection on the path and modification of the reserved connection on the new path to establish the connection on the new path, or, responsive to a failure affecting the connection, cause release of the connection on the path and modification of the reserved connection on the new path to switch the connection to the new path which is a protect path. Setting up a working path on any portion of the new path can preempt the reserved connection. The reserved connection can be one of a Zero Bandwidth Subnetwork Connection (SNC) and/or an unconstrained Label Switched Path (LSP). The node can be unable or unwilling to support broadcast and select. The new path can support overbooking for the reserved connection and one or more additional reserved connections with a first connection of the reserved connection and the one or more additional reserved connection converting to active occupying the new path. The signal of the reserved connection can indicate a plurality of parameters including whether the reserved connection is blocking or non-blocking.

In a further exemplary embodiment, a network configured to operate a control plane and configured to perform Make-Before-Break (MBB) where the control plane is decoupled from the data plane, includes a plurality of nodes; and a plurality of links interconnecting the plurality of nodes; wherein a plurality of calls are configured in the network, through the control plane, wherein a plurality of reserved connections are configured in the network in the control plane, but not in the data plane since each of the plurality of reserved connections has zero bandwidth, and wherein to switch a call of the plurality of calls to an associated reserved connection, the call is released and the associated reserved connection is modified. One or more of the plurality of nodes can utilize a switch fabric that is unable or unwilling to support broadcast and select.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a flow chart of a Routing and Wavelength Assignment (RWA) process, which can be used in the network of FIGS. 6 and 7 or the like;

DETAILED DESCRIPTION OF THE DISCLOSURE

In various exemplary embodiments, MBB systems and methods with a unicast fabric in control plane networks are described. The MBB systems and methods allow a control plane enabled-network to perform MBB operations even if one or more nodes is using a non-bi-cast fabric. The MBB systems and methods involve disassociating control plane state from the data plane state. Essentially, during a MBB operation, the endpoints, that would normally drive the bridge and select (data plane), are suspended until the delete operation of the working leg is performed. All the control plane benefits involving MBB operations are maintained; the data plane outage is increased, but not to the extent that would be experience using BBM. All the control plane benefits involving MBB operations are maintained. These operations include reversion, RHP reversion, maintenance operations (e.g. bridge and roll), call data plane optimization functions (e.g. assignment of new nominal path (re-groom)). The MBB systems and methods may also be implemented on broadcast-and-select fabric. For example, consider a packet node with limited multicast capabilities, if fabric broadcast and select (multicast) resources are tight (e.g. distributed fabric and fabric adapters where the number of multicast queue are limited) then the system may determine it is best to perform the MBB operations with the MBB systems and methods described herein rather than using the fabric broadcast-and-select capabilities.

Exemplary Control Plane Network

Figure 1:
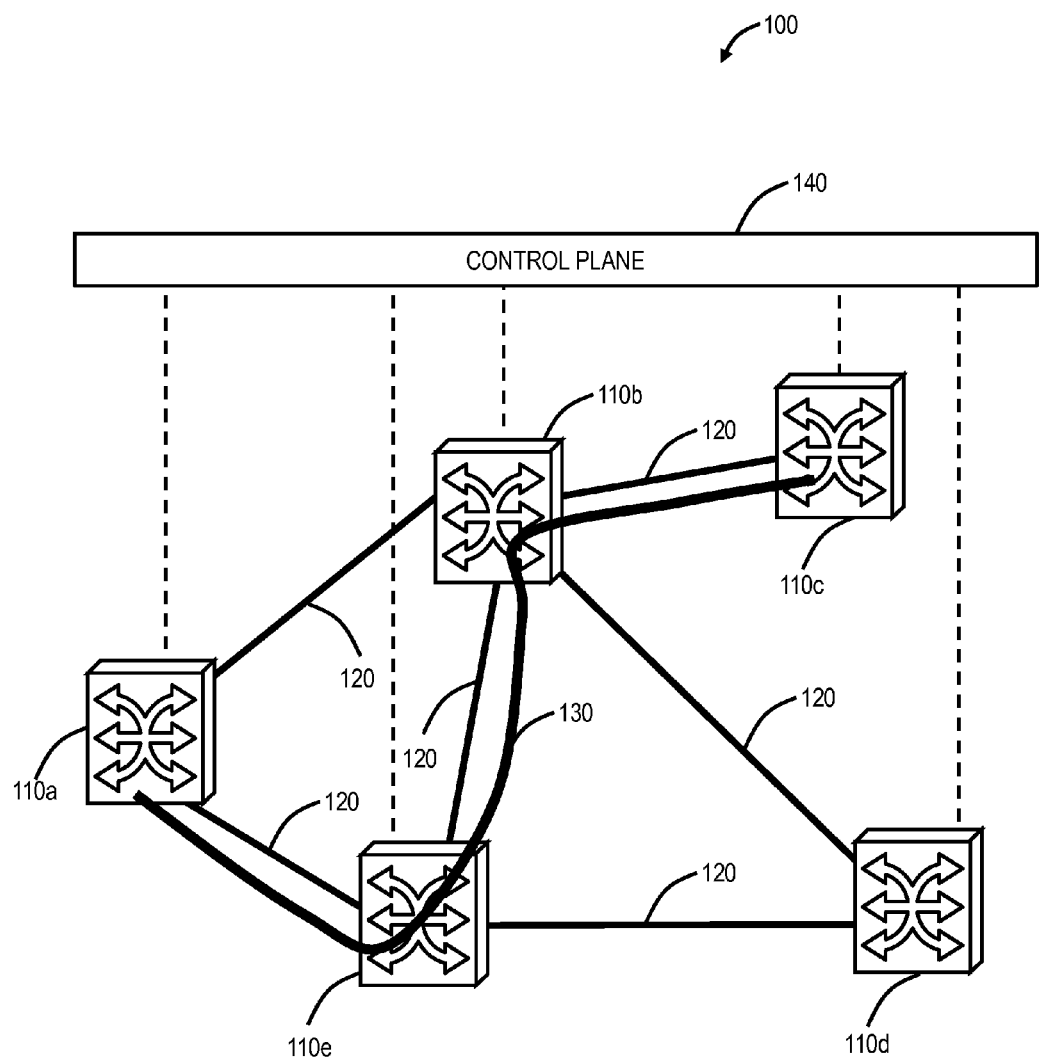
FIG. 1 is a network diagram of an exemplary control plane network with five interconnected nodes.
Figure 13:
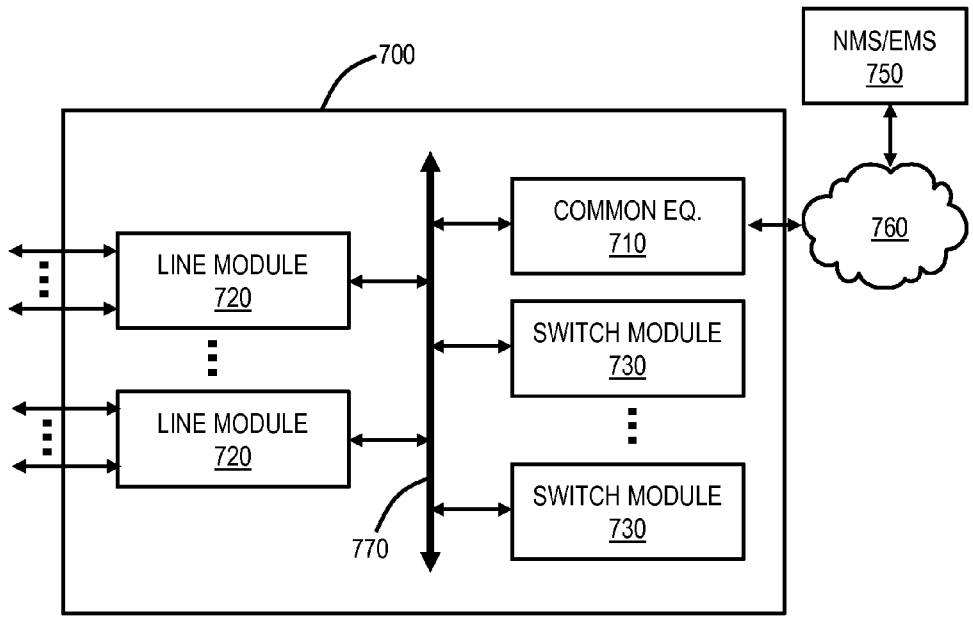
FIG. 13 is a block diagram of an exemplary node for use with the systems and methods described herein.

Referring to FIG. 1, in an exemplary embodiment, a network diagram illustrates an exemplary control plane network 100 with five interconnected nodes 110a, 110b, 110c, 110d, 110e. The nodes 110 are interconnected through a plurality of links 120. The nodes 110 communicate with one another over the links 120 through L0, L1, and/or L2 protocols. The nodes 110 can be network elements which include a plurality of ingress and egress ports forming the links 120. An exemplary node implementation is illustrated in FIG. 13. The network 100 includes a connection 130 with ingress/egress at the nodes 110a, 110c and intermediate nodes 110b, 110e. The connection 130 can be at any of the L0, L1, and/or L2 protocols, such as a wavelength, a SNC, a Label Switched Path (LSP), etc. The connection 130 is an end-to-end path or an end-to-end signaled path and from the view of the client signal contained therein, it is seen as a single network segment. The nodes 110 can also be referred to interchangeably as network elements (NEs). The control plane network 100 is illustrated, for example, as an interconnected mesh network, and those of ordinary skill in the art will recognize the control plane network 100 can include other architectures, with additional nodes 110 or with less nodes 110, etc.

The control plane network 100 can include a control plane 140 operating on and/or between the nodes 110a, 110b, 110c, 110d, 110e. The control plane 140 includes software, processes, algorithms, etc. that control configurable features of the OTN network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. Optical (i.e., transport) networks and the like (e.g., Wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; Wavelength Switched Optical Network (WSON); or any other type control plane for controlling network elements at multiple layers, and establishing connections therebetween. In an exemplary embodiment, the control plane 140 can utilize ASON, GMPLS, OSRP, WSON, or the like. Those of ordinary skill in the art will recognize the OTN network 100 and the control plane 140 can utilize any type of control plane for controlling the nodes 110 and establishing connections therebetween.

In the terminology of ASON and OSRP, sub-network connections (SNC) are end-to-end signaled paths since from the point of view of a client signal, each is a single network segment. In GMPLS, the connections are an end-to-end path referred to as LSPs. For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In the various descriptions herein, reference is made to SNCs for illustration only of an exemplary embodiment of the MBB systems and methods. Those of ordinary skill in the art will recognize that SNCs and LSPs can both be used with the systems and methods described herein for end-to-end paths.

Figure 2:
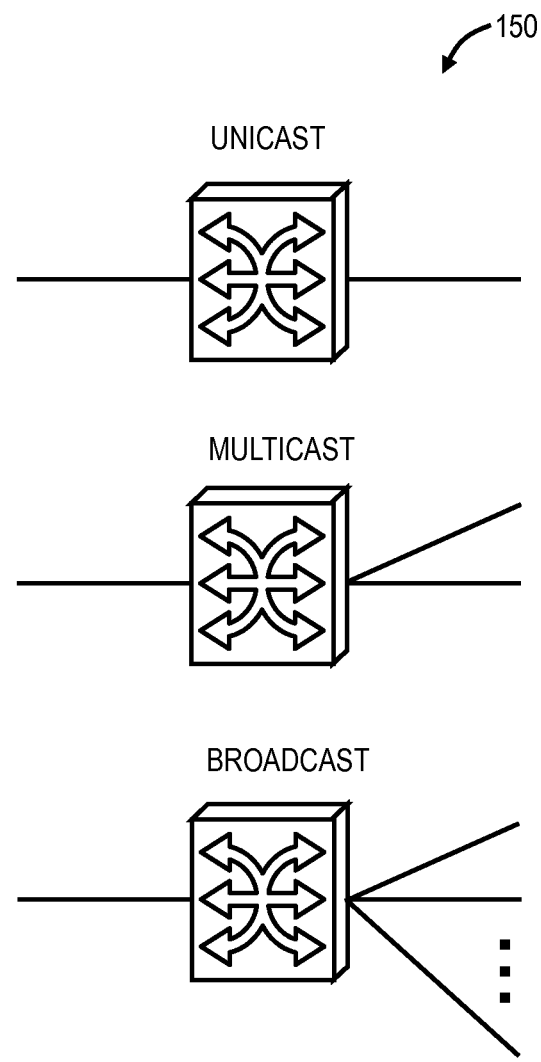
FIG. 2 is a logical diagram of switch fabrics showing unicast, broadcast, and multicast select operations.

Referring to FIG. 2, in an exemplary embodiment, a logical diagram illustrates switch fabrics 150 showing unicast, broadcast, and multicast operation. The switch fabrics 150, in the MBB systems and methods, contemplate operation at L0 (Photonic), L1 (Time Division Multiplexing (TDM) such as OTN, SONET, SDH), and/or L2 (Packet such as Ethernet, MPLS, etc.). The unicast switch fabric can route an ingress signal to only one egress point, and typically L0 switches (e.g., Wavelength Selective Switches (WSSs), Reconfigurable Optical Add/Drop Multiplexers (ROADMs), etc.) are unicast. The multicast and broadcast switch fabrics can route the ingress signal to multiple egress points with broadcast being to all egress points and multicast being to selected egress points.

MBB Process with Reserved Connection

As described herein, MBB operation requires the multicast or broadcast switch fabrics. MBB means that a new connection is made, the ingress signal to another egress point, before a current connection is released, the ingress signal to a previous egress point. In the switch fabric, the MBB operation generally includes a broadcast and select operation. For the multicast and broadcast switch fabrics, this is implemented by creating the new connection while the old connection operates for the make portion, and performing a break by selecting the new connection and releasing the old connection. The MBB systems and methods provide an ability to perform MBB with the unicast switch fabric, by decoupling the data plane from the control plane. Specifically, a reserved connection is formed and setup in the control plane, with no bandwidth or zero bandwidth, with no impact to the underlying hardware. Once the reserved connection is established in the control plane, a MBB operation can be performed in the underlying hardware by releasing the old connection and modifying the reserved connection.

Figure 3:
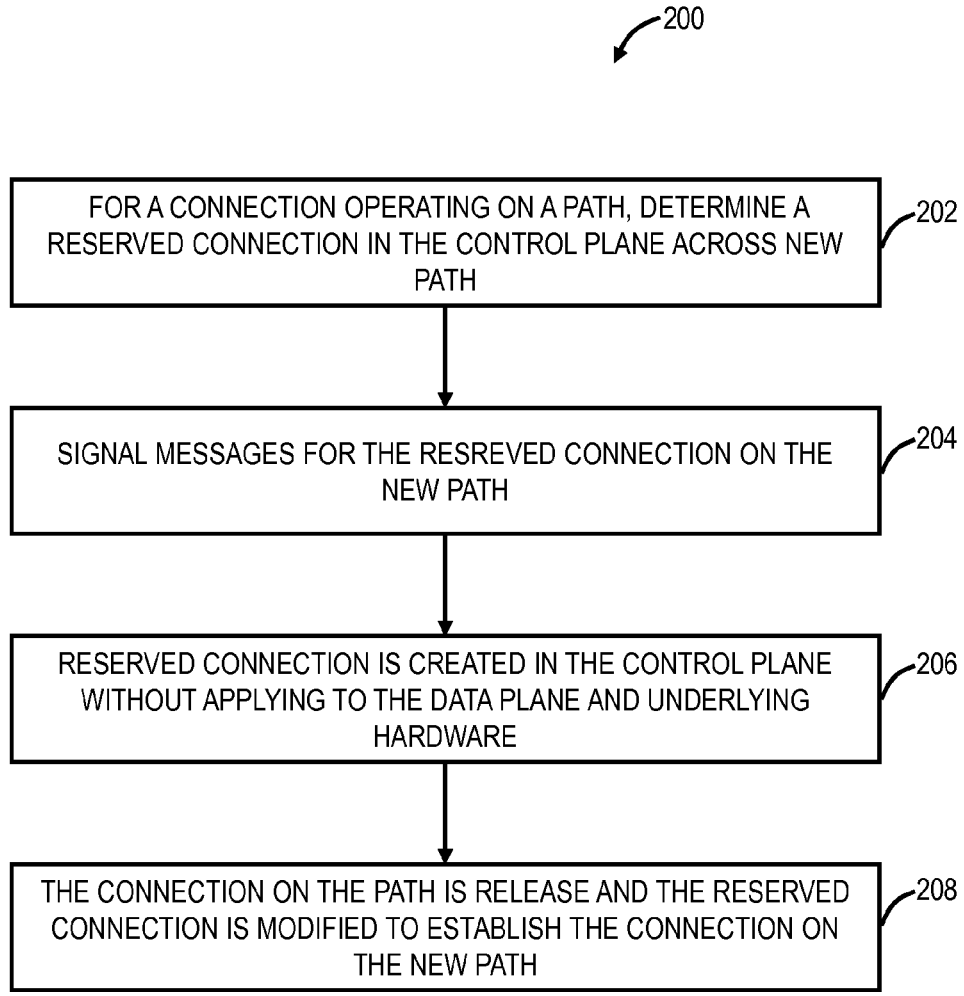
FIG. 3 is a flow chart of a MBB process which decouples the data plane from the control plane.

Referring to FIG. 3, in an exemplary embodiment, a flow chart illustrates a MBB process 200 which decouples the data plane from the control plane. The MBB process 200 contemplates operation at the nodes 110 in the network 100. The MBB process 200 decouples the data plane from the control plane, allowing MBB operations with unicast fabrics or with multicast fabrics without using physical hardware until the break operation. The MBB process 200 includes, for a connection operating on a path, determining a reserved connection in the control plane across a new path (step 202). Here, the reserved connection can be a Zero Bandwidth SNC or an unconstrained LSP. The reserved connection can be across a protect path or the like, and the reserved connected can be overlapping, partially overlapping, or totally diverse from the connection.

Signaling messages are sent, through the control plane, for the reserved connection on the new path (step 204). The signaling messages allow for control plane setup of the reserved connection on the new path, without involving the hardware. In this manner, the make operation can be performed in the control plane (which is software-based and slower than the hardware operation). For example, a notify message can be initiated across the new path, e.g. a protect path, to enable the cross-connects, in the control plane, for the nodes 110 which do not require a broadcast and select operation, such as either on same or different wavelength. After the signaling messaging, the reserved connection is created in the control plane, without applying the reserved connection to the data plane and the underlying hardware (step 206). The reserved connection is a control plane service which does not program the underlying hardware, i.e. the data plane, since it has zero bandwidth. Once the reserved connection is created, as a control plane service, the connection on the path is released, and the reserved connection is modified to establish the connection on the new path (step 208). This includes a release of the service on the connection, and subsequently modifying the segments with broadcast and select, where available, or reestablishment on the reserved connection where broadcast and select is unavailable. On an overlapping path, no action is necessary, and only the cross-connects are modified.

MBB Control Plane Process

Figure 4:
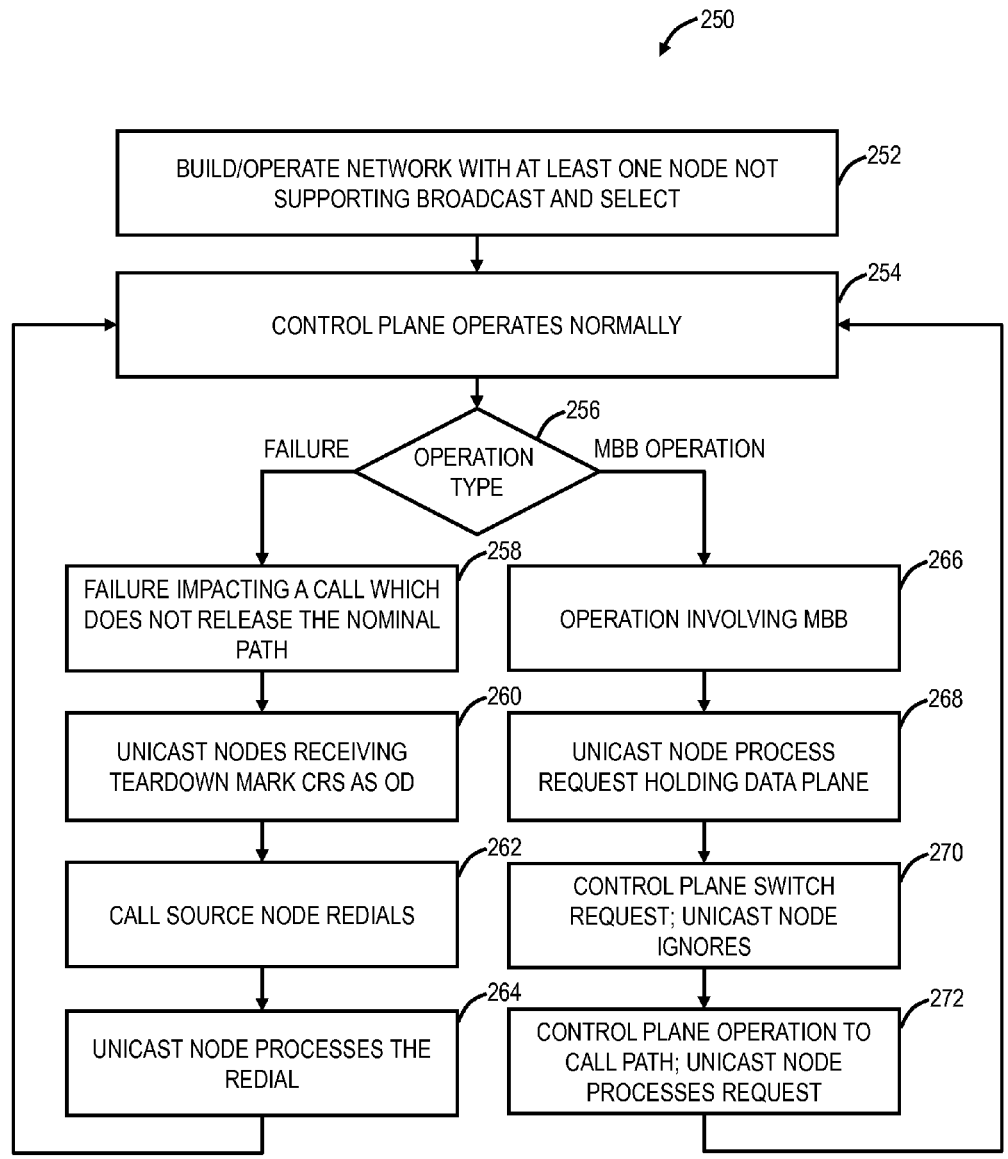
FIG. 4 is a flow chart of a control plane process which decouples the data plane from the control plane.

Referring to FIG. 4, in an exemplary embodiment, a flow chart illustrates a control plane process 250 which decouples the data plane from the control plane. The control plane process 250 contemplates operation at the nodes 110 in the network 100. The control plane process 250 provides additional details from the MBB process 200, for a failure operation and a MBB operation. The control plane process 250 include building/operation a network with at least one node not supporting broadcast and select (step 252). Here, the at least one node cannot provide MBB operations, in the conventional sense. Alternatively, all the nodes could support broadcast and select, but choose to use the MBB process 200 here for hardware efficiencies as described above. The network operates a control plane normally, and the control plane supports MBB operations and features (step 254). Also, during normal operation, assume there are one or more calls in the network with each call being a control plane managed connection, e.g. SNC, LSP, wavelength, etc. Note, the MBB operations and features utilize, generally, the MBB process 200. The control plane process 250 allows the control plane bridge and roll state to be disassociated for broadcast and/or select operations.

The control plane process 250 is illustrated with two exemplary operations (step 256). First, responsive to a network failure impacting a call which does not release the nominal path (e.g. Retain home path (RHP)) (step 258), a tear down notification is sent and a unicast node receiving the tear down notification notes that the underlying cross connect (CRS) is operationally down (OD) (step 260). The unicast node is a node operating according to the MBB process 200 and may also be a broadcast/multicast node set to use the MBB process 200. The unicast node may or may not remove the cross connect from the data plane at this time. The source node, of the affected call, redials the connection in a usual manner per the control plane (step 262). The unicast node processes a request for the redial that results in a bridge and/or select operation (step 264). If the cross connect is OD, then the existing cross connect is replaced with a new cross connect, and the original cross connect is queued and stored as OD. Subsequently, the control plane operates normally (step 254).

For a MBB operation (step 256), a user-initiated operation involving MBB is performed (step 266). This is the "Make" in MBB. For the operation, the control plane operates in the usual manner, making a request for the MBB operation. The unicast node processes the request, but holds it with respect to the data plane (step 268). Since, the request is for the MBB operation, the unicast node processes the request and the result in the data plane is a bridge and/or select operation. If this involves a cross connect that is OD, then it is marked as operationally up. In all cases the cross connect is held and not dispatched to the data plane. Optionally, the control plane may signal an operation to gracefully switch traffic to the new path. The unicast node processes a request that would result in a data plane selector switch operation. This request is ignored (step 270). Optionally, the control plane may signal an operation to call path from the network. This is the "Break" in MBB. Here, the unicast node processes a request that would result in a data plane cross connect deletion (step 272). If the cross connect is to be removed, it is queued then it is removed from the queue. If the existing cross connect is in the data plane, then it is removed. If a cross connect is queued for a member that was removed, then cross connect CRS is installed. It is beneficial to perform both operations as a single transaction in a batch. That is, if the existing cross connect is OD, then activating the pending one is performed. If the existing cross connect is up, then the control plane process 250 includes either activating the pending one (e.g. swap) or waiting for a control plane operation and do it then.

Exemplary Operation with a Zero Bandwidth SNC

Figure 5:
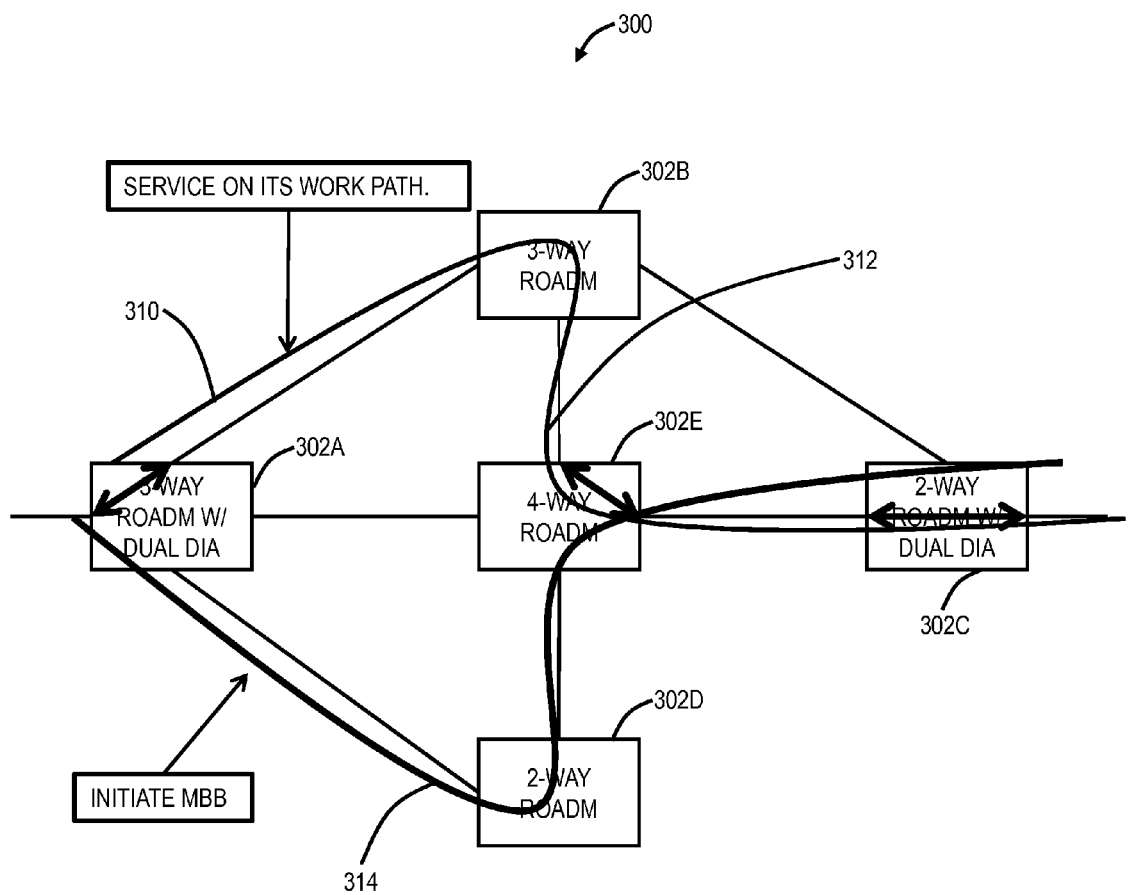
FIG. 5 is a network diagram of a network, operating a control plane, for illustrating an operation of the MBB process of FIG. 3

Referring to FIG. 5, in an exemplary embodiment, a network diagram illustrates a network 300, operating a control plane, for illustrating an operation of the MBB process 200. The network 300 is a photonic network with various ROADM nodes 302A-302E. The ROADM node 302A is a 3-way (degree) node with a dual Direction Independent Architecture (DIA), and the ROADM node 302C is a 2-way node with the dual DIA. The ROADM node 302B is a 3-way node, the ROADM node 302E is a 4-way node, and the ROADM node 302D is a 2-way node. There is a service 310 configured on a working path 312, between the ROADM nodes 302A, 302B, 302E, 302C. For example, the service 310 can be a wavelength. It is desired to perform a MBB operation to move the service 310 to a new path 314, using the MBB process 200. First, a Zero Bandwidth SNC is created on the path 314. A notify message is sent by the control plane across the path 314 to enable cross-connects on the path 314, but no hardware is programmed. Bandwidth is allocated on all of the segments, between the ROADM 302A, 302D, 302E, 302C, but it is not applied. Next, the service 310 is released on the path 312, and the Zero Bandwidth SNC is modified with broadcast and select, on the path 314.

Layer 0 Routing

Routing services in a photonic (L0) network encounter various constraints, such as wavelength continuity blocking, retune capability blocking due to colored transceivers, regenerator path vs non-regenerator path blocking, partial connectivity blocking, and the like. The above mentioned blocking needs to be accounted for protection paths at the time of restoration/re-groom/revert operations. This requires the correlation of implicit/explicit protect paths so that services can be rerouted optimally accounting for above-mentioned blocking criteria. In the following examples, it is shown how the correlation of protect paths, using the MBB process 200, accounts for the above mentioned blocking issues.

Exemplary MBB Operation by Retuning Colorless Transceivers

Figure 6:
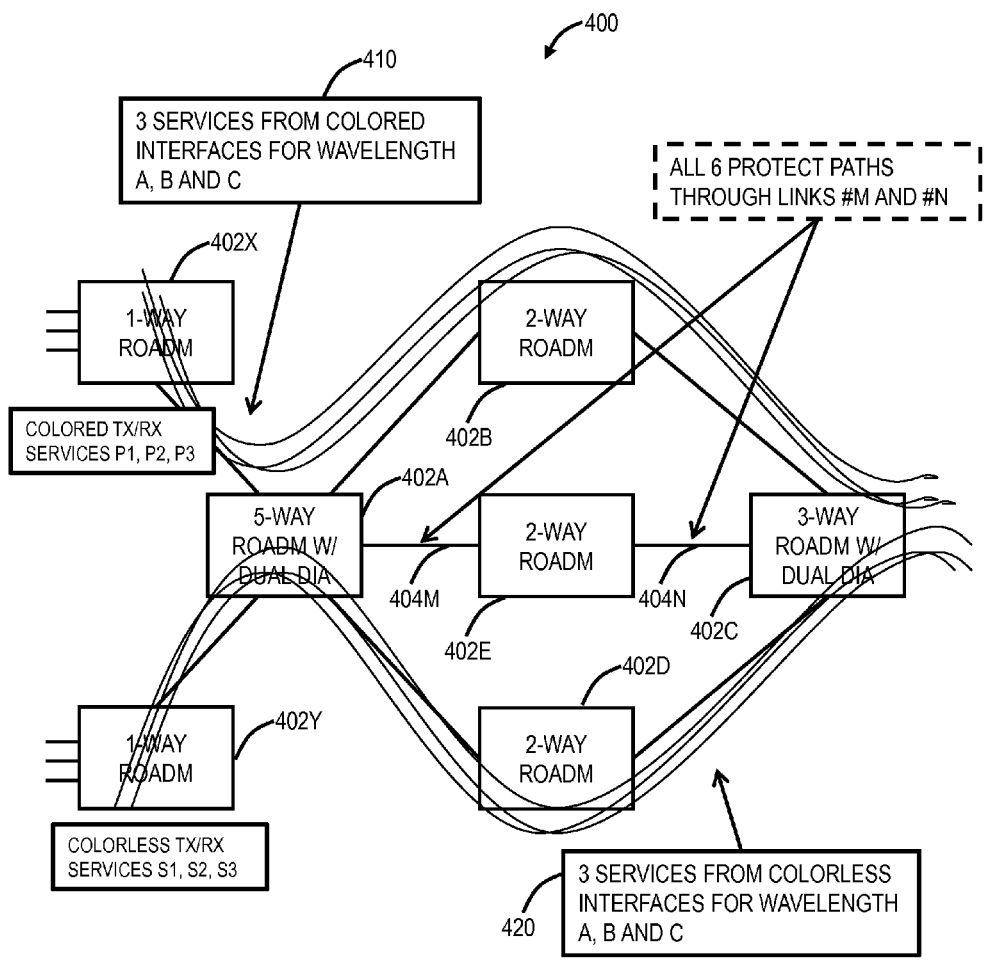
FIGS. 6 and 7, in an exemplary embodiment, a network diagram illustrates a network with an operation of retuning colorless transceivers due to blocking based on colored transceivers.
Figure 7:
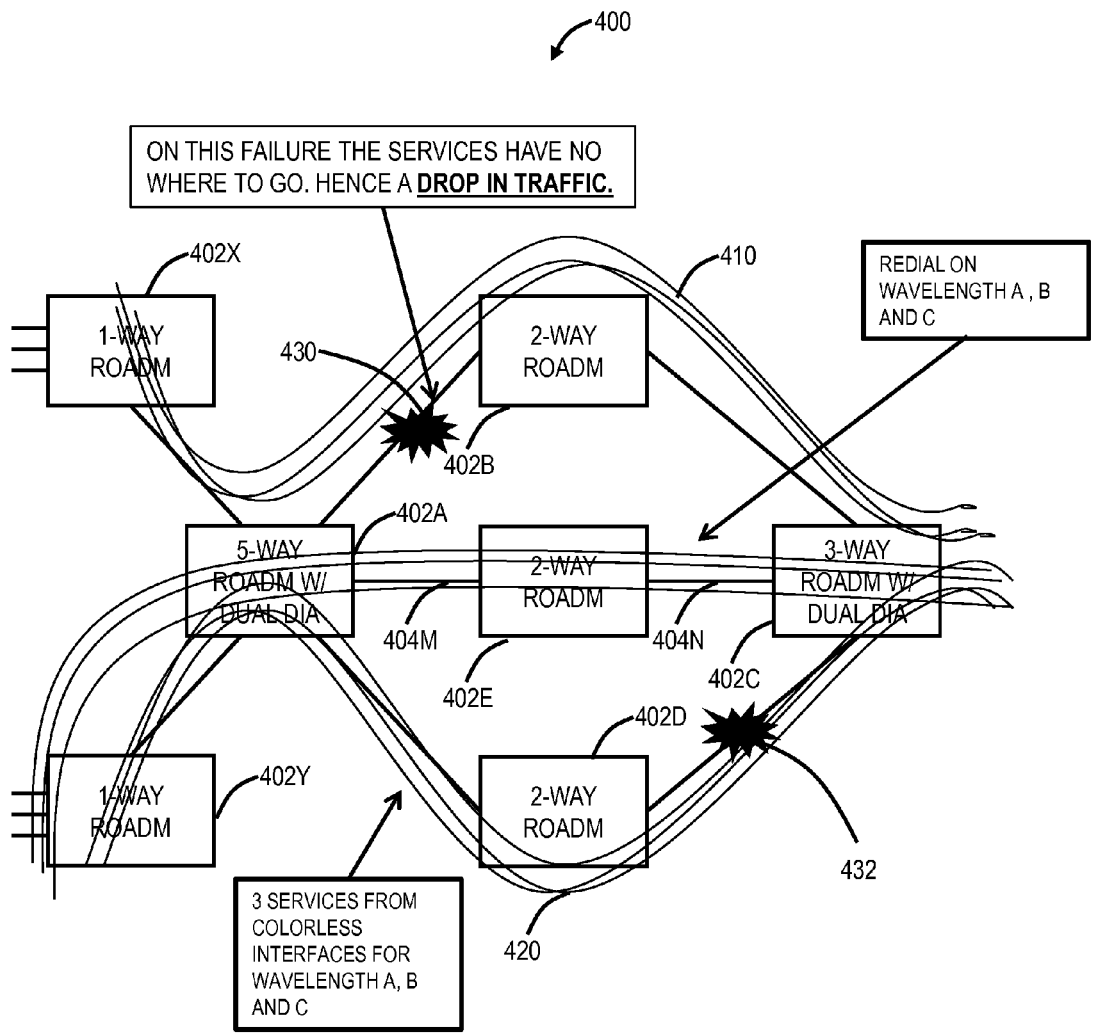

Referring to FIGS. 6 and 7, in an exemplary embodiment, a network diagram illustrates a network 400 with an operation of retuning colorless transceivers due to blocking based on colored transceivers. The network 400 is a photonic network with various ROADM nodes 402A-402E, 402X, 402Y with various interconnecting links 404 (labeled as 404M, 404N). The nodes 402X, 402Y are source nodes with 1-way ROADMs. The node 402A is a 5-way ROADM with dual DIA, and the node 402C is a 3-way ROADM with dual DIA. The nodes 402B, 402E, 402D are each 2-way ROADMs. There are three services P1, P2, P3 410 from the node 402X to the node 402C on a path between the nodes 402X, 402A, 402B, 402C, and the services 410 are on wavelengths A, B, C formed by colored transceivers at the node 402X. The colored transceivers are fixed to the wavelengths A, B, C. There are three services S1, S2, S3 420 from the node 402Y to the node 402C on a path between the nodes 402Y, 402A, 402D, 402C, and the services 420 are on wavelengths A, B, C formed by colorless transceivers at the node 402Y. The colorless transceivers can retune to different wavelengths.

Note, in normal operation, the services 410, 420 are on disjoint paths and thus can use the same wavelengths A, B, C, but for protect paths, all of the services 410, 420 go through the links 404M, 404N. The services 420 can be redialed by selecting the wavelengths A, B, C or any other wavelength (since the transceivers are colorless). The services 410 can only be redialed by selecting the wavelengths A, B, C due to the colored transceiver. The only way to accommodate all of the services 410, 420 on the links 404M, 404M on redials for both is to retune the services 420, off of the wavelengths A, B, C, so that the services 420 can be accommodated on the wavelengths A, B, C.

Again, the network 400, or any other photonic network, can include a combination of colorless and colored interfaces. Services can redial to a different path, and retune to different wavelengths when they use colorless interfaces. Correlation of the protect paths is important to reduce the blocking in the network. In FIG. 7, an example of the MBB process 200 is described. Here, protect Zero Bandwidth SNCs (or unconstrained LSPs) are installed on the protect path, the links 404M, 404N, for each of the services 410, 420. Here, the protect Zero Bandwidth SNCs for the services 410 reserve the wavelengths A, B, C for the services 410 on the links 404M, 404N. The Zero Bandwidth SNCs for the services 420 reserve the wavelengths A, B, C for the services 420 on the links 404M, 404N, but these Zero Bandwidth SNCs will conflict with the Zero Bandwidth SNCs for the services 410. Specifically, the Zero Bandwidth SNCs for the services 420 will be crank backed or dialed back with a request to retune wavelengths. This helps avoid blocking of services in the network 400 due to the aforementioned constraints of the colored transceivers.

Specifically, in FIG. 7, the services 410 have the Zero Bandwidth SNCs set on the links 404M, 404N for the wavelengths A, B, C, and the services 420 have the Zero Bandwidth SNCs set on the links 404M, 404N for different wavelengths, i.e. retuned from the wavelengths A, B, C. FIG. 7 illustrates two failures 430, 432, affecting both the services 410, 420, causing a switch to their associated Zero Bandwidth SNCs. Here, the services 420 retune their wavelengths per the Zero Bandwidth SNCs thereby enabling the links 404M, 404M to support all six services 410, 420.

Routing and Wavelength Assignment (RWA) with MBB Process

Figure 8:
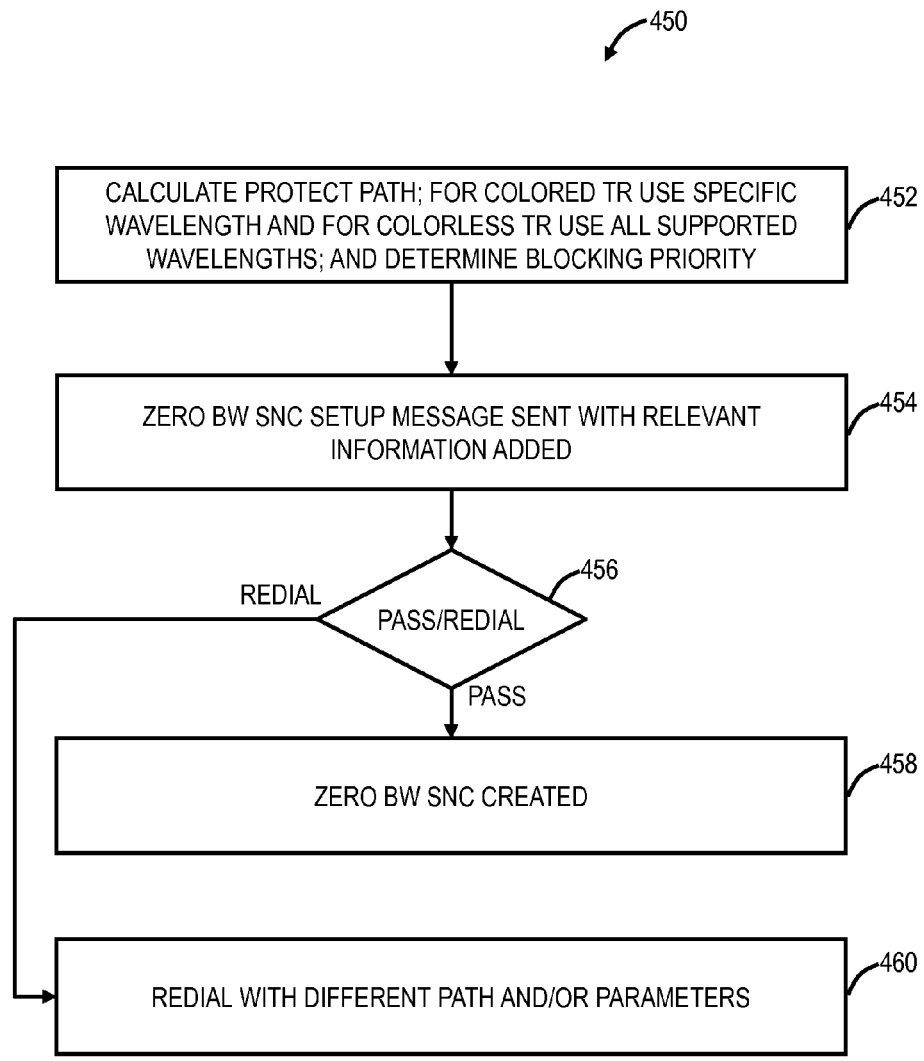

Referring to FIG. 8, in an exemplary embodiment, a flow chart illustrates a RWA process 450, which can be used in the network 400 or the like. The RWA process 450 can be used for high priority services. The RWA process 450 includes calculating a protect path, for colored transceivers using a specific wavelength and for colorless transceivers using all support wavelengths, and determining blocking priority (step 452). For example, the path calculation can use a shortest path algorithm for photonic services, e.g. a k-shortest path algorithm. Also, the path calculation can include regenerator requirements, if a path must go through a regenerator. For the protect path computation, the Zero Bandwidth SNCs are defined as either protect blocking or protect non-blocking, for other Zero Bandwidth SNCs. For protect blocking, the Zero Bandwidth SNC is the exclusive service for this protect path, and for protect non-blocking, other Zero Bandwidth SNCs can use the same path. Note, for the blocking, the blocking is only between other Zero Bandwidth SNCs, and a setup for a working path can always preempt the Zero Bandwidth SNCs.

Once computed, a Zero Bandwidth SNC setup message is sent with the relevant information added (step 454). The setup message is used on the protect path to create the Zero Bandwidth SNC (or unconstrained LSP). The relevant Information is added to the setup message to indicate the type of service/constraints, such as the extra Layer 0 requirements and blocking priority that is installed with each call point, in the Zero Bandwidth SNC. Again, note the Zero Bandwidth SNC does not occupy any resources (XCONs/BW). The Zero Bandwidth SNC is only used for contention correlation with other Zero Bandwidth SNCs only. Also, the protect path resources can be overbooked only if one of the services has strict requirements for the path or no strict requirements for the path, but no alternate routes are available. In this case, it can try to choose different resource on the same route (i.e. different wavelengths for colorless ports).

Based on the above, the Zero Bandwidth SNC either passes or fails and redials (step 456). If the Zero Bandwidth SNC passes, the Zero Bandwidth SNC is created (step 458). If the Zero Bandwidth SNC fails, it is redialed with a different path and/or different parameters (step 460). Three different cases/scenario exist, for the RWA process 450 with the Zero Bandwidth SNCs. First, a resource cannot be shared between two Zero Bandwidth SNCs unless oversubscription is enabled. Second, if there is zero bandwidth for non-blocking protect priority on the resource, in case of a new incoming connection point that is "protect non-blocking", it would be overbooked, and in case of a new incoming connection point that is "protect blocking", it would preempt any existing Zero Bandwidth SNC. The preempted Zero Bandwidth SNC would be released and a new Zero Bandwidth SNC for the new "protect blocking" service would be installed. Note, if the preempted Zero Bandwidth SNC already is a "protect blocking" service with higher priority, it would not be preempted.

Third, for a Zero Bandwidth SNC blocking protect priority on the resource, in case the new incoming connection point is "protect non-Blocking" type, it would crank-back the incoming setup with relevant information so that it establishes on a different path, and in case the incoming connection point is of "protect blocking" type, it would overbook the resource. Thus the first service which converts Zero Bandwidth SNC to active because of failure or manual action for the overbooked resource would occupy it.

Exemplary MBB Operation with Partial Connectivity

Figure 9:
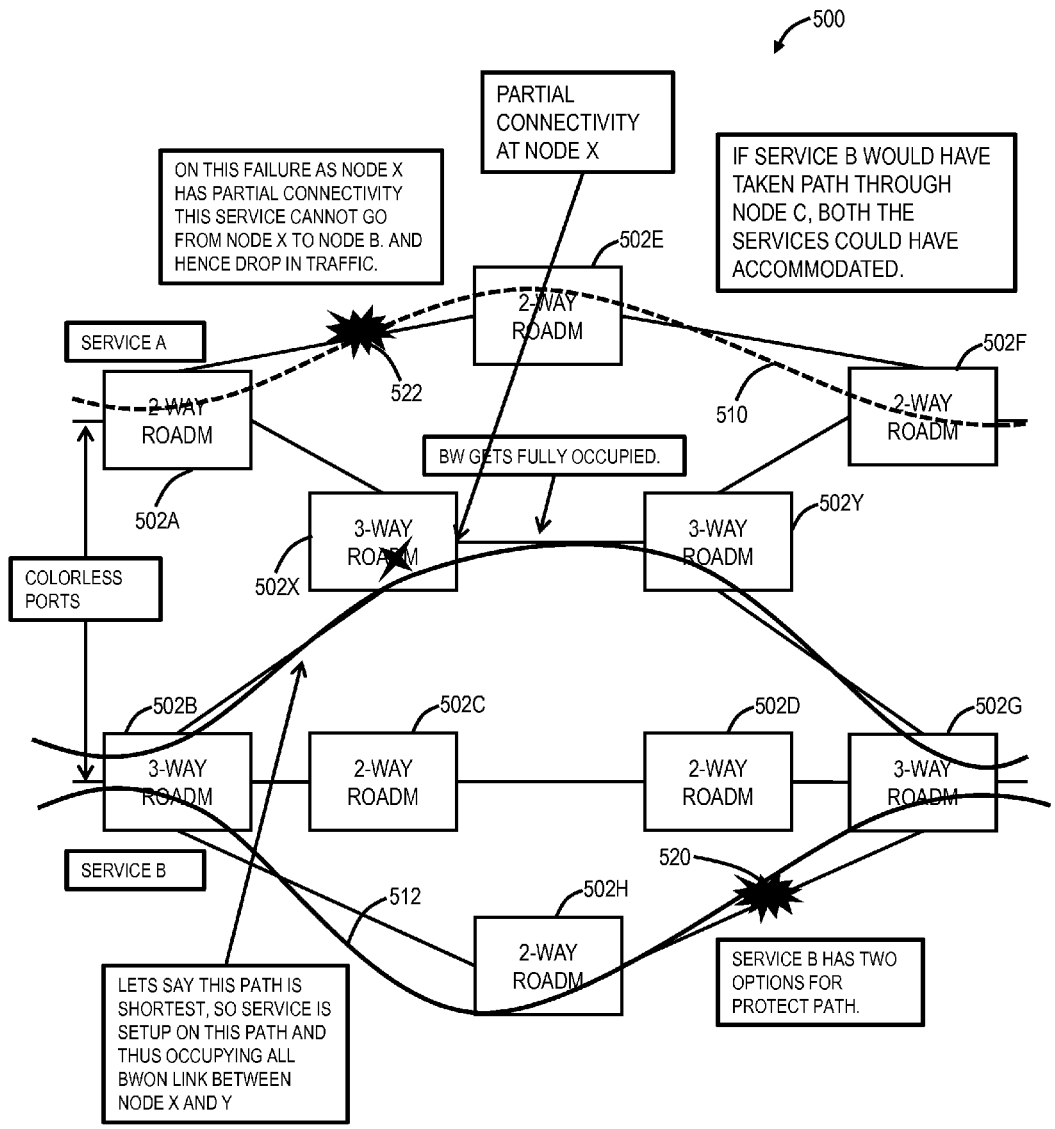
FIGS. 9 and 10 are network diagrams of a network showing the MBB process of FIG. 2 and the RWA process of FIG. 8 with partial connectivity.
Figure 10:
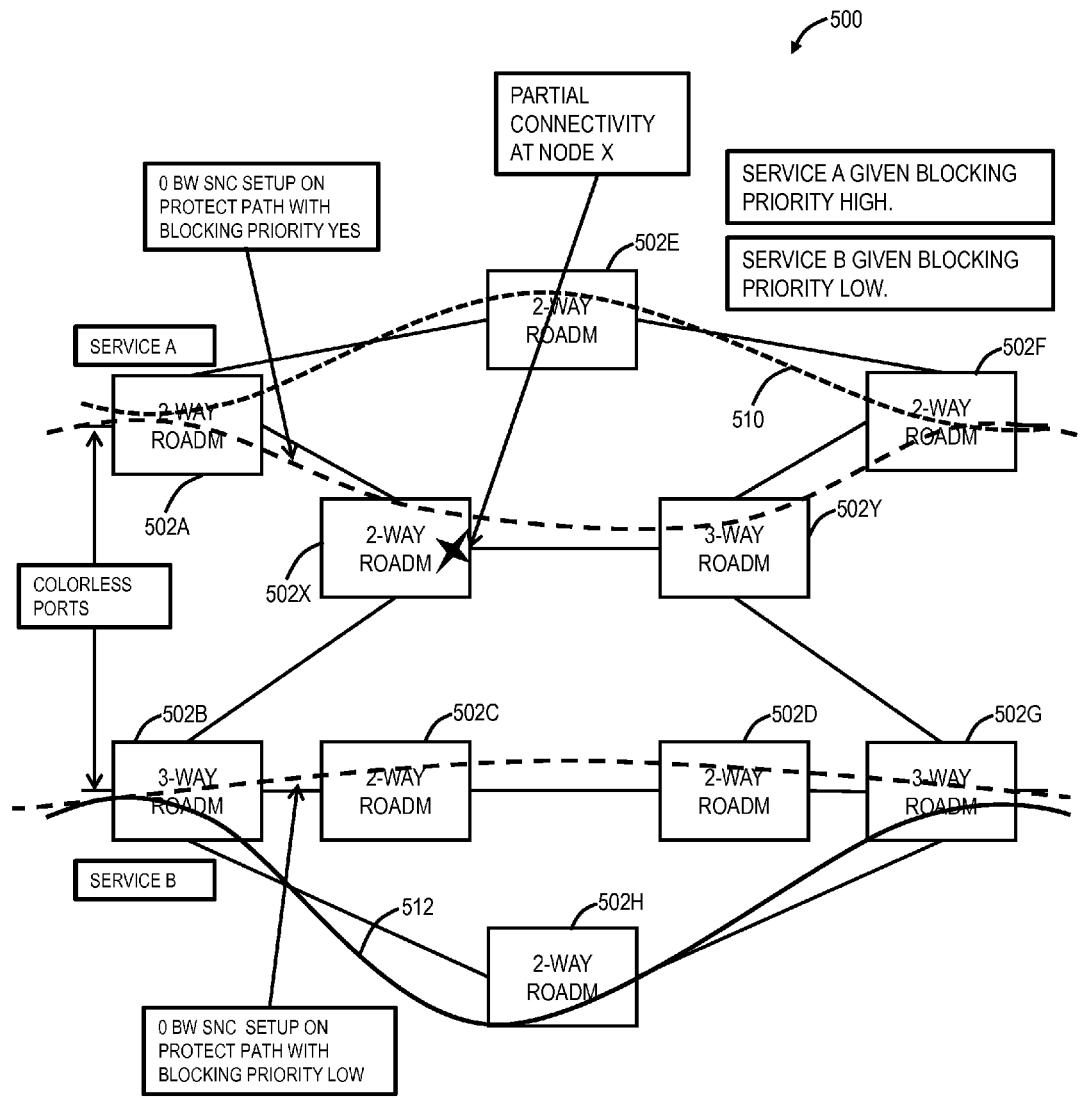

Referring to FIGS. 9 and 10, in an exemplary embodiment, network diagrams illustrate a network 500 showing the MBB process 200 and the RWA process 450 with partial connectivity. The network 500 is a photonic network and includes ROADM nodes 502A-502H, 502X, 502Y. The ROADM nodes 502A, 502E, 502F, 502C, 502D, 502H are 2-way nodes, and the ROADM nodes 502B, 502G, 502X, 502Y are 3-way ROADM nodes. In FIG. 9, the network 500 includes a service A 510 between the nodes 502A, 502E, 502F, and a service B 512 between the nodes 502B, 502H, 502G. Both the services 510, 512 are based on colorless ports. Assume there is a failure 520 affecting the service B 512. The service B 512 has two options for its protect path—a first path between the nodes 502B, 502C, 502D, 502G or a second path between the nodes 502B, 502X, 502Y, 502G. Assume the second path is shorter, so the service B 512 is set up on this second path and this occupies all of the bandwidth between the nodes 502X, 502Y—there is blocking here, partial connectivity.

Next, assume there is another failure 522, the service A 510 is unable to restore because the node 502X has partial connectivity, and the service A 510 cannot go from the node 502X to the node 502B. However, if the service B 512 went between the nodes 502C, 502D, both of the services 510, 512 could have been accommodated. This is illustrated in FIG. 10. Here, the service A 510 sets up a Zero Bandwidth SNC on the path between the nodes 502A, 502X, 502Y, 502Y with blocking priority set to yes. The service B 512 sets up a Zero Bandwidth SNC on the path between the nodes 502B, 502C, 502D, 502G with blocking priority low. In this manner, the situation in FIG. 9 is avoided due to the failures 520, 522.

Exemplary MBB Operation with Blocking Due to Regenerator Requirement

Figure 11:
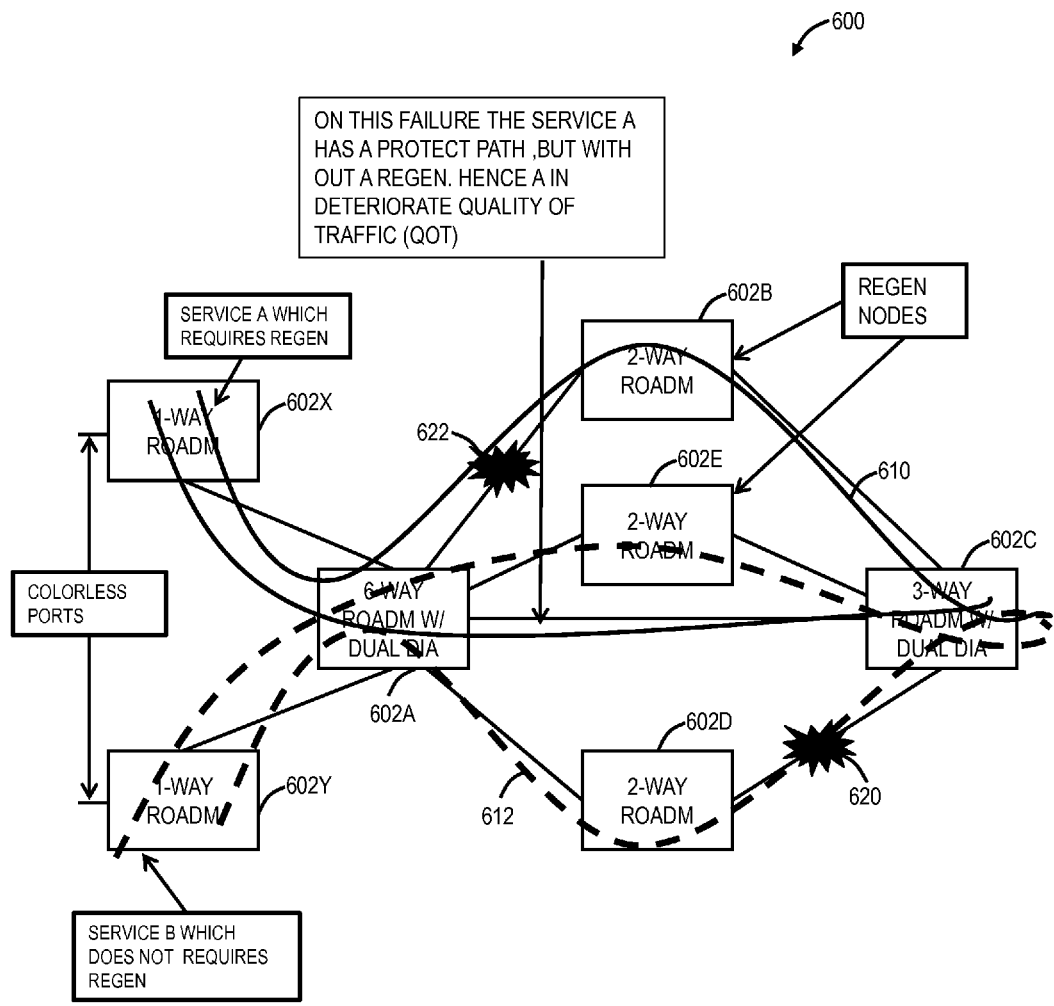
FIGS. 11 and 12 are network diagrams of a network showing the MBB process of FIG. 2 and the RWA process of FIG. 8 with blocking due to a regenerator requirement
Figure 12:
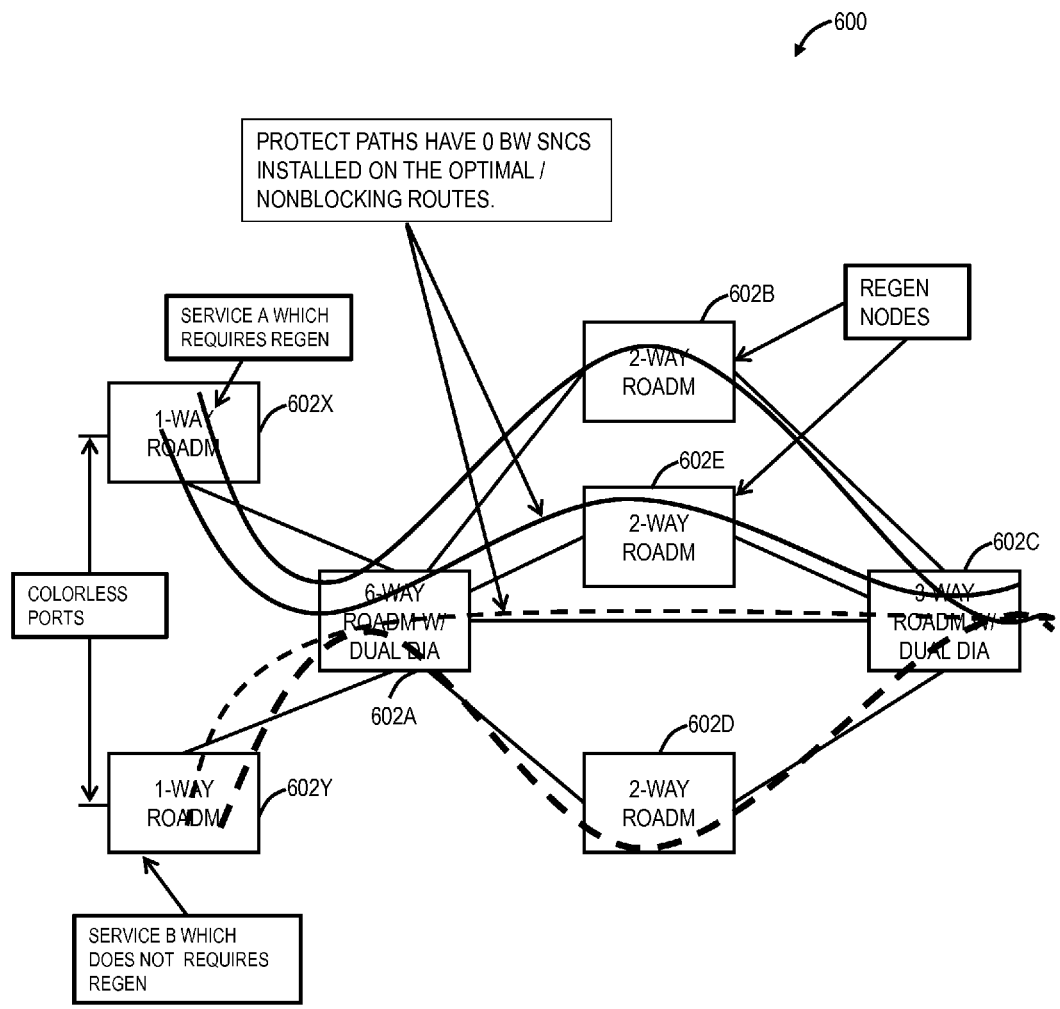

Referring to FIGS. 11 and 12, in an exemplary embodiment, network diagrams illustrate a network 600 showing the MBB process 200 and the RWA process 450 with blocking due to a regenerator requirement. The network 600 is a photonic network with ROADM nodes 602A-602E, 602X, 602Y. The ROADM node 602A is a 6-way ROADM node with dual DIA, and the ROADM node 602C is a 3-way ROADM node with dual DIA. The ROADM nodes 602B, 602D, 602E are 2-way ROADM nodes, and the ROADM nodes 602X, 602Y are 1-way ROADM nodes. Also, the ROADM nodes 602B, 602E include regeneration. The network 600 includes services 610, 612. The service 610 is on a path between the nodes 602X, 602A, 602B, 602C and the service 612 is on a path between the nodes 602Y, 602A, 602D, 602C. Note, both the services 610, 612 are colorless ports, and the service 610 requires a regenerator, at the node 602B.

In FIG. 11, assume there are failures 620, 622, and either the service 612 reroutes to the path between the nodes 602Y, 602A, 602E, 602C (with a regenerator at the node 602E) or the service 610 reroutes to the path between the nodes 602X, 602A, 602C (without a regenerator). Here, the service 610 moves from a path with a regenerator to one without a regenerator. This can result in a deterioration of the quality of traffic. In FIG. 12, this is accounted for by provisioning Zero Bandwidth SNCs for the services 610, 612 which have the service 610 take the protect path between the nodes 602X, 602A, 602E, 602C which includes the regenerator at the node 602E and the service 612 take the protect path between the nodes 602Y, 602A, 602C.

Exemplary Network Element/Node

Referring to FIG. 13, in an exemplary embodiment, a block diagram illustrates an exemplary node 700 for use with the systems and methods described herein. In an exemplary embodiment, the exemplary node 700 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM)

platform, etc. into a single, high-capacity intelligent switching system providing Layer 0, 1, and/or 2 consolidation. In another exemplary embodiment, the node 700 can be any of an OTN Add/Drop Multiplexer (ADM), ROADM, a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 700 can be any digital system with ingress and egress digital signals and switching therebetween of channels, timeslots, tributary units, etc. and/or photonic system with ingress and egress wavelengths and switching therebetween (ROADM). While the node 700 is generally shown as an optical network element, the systems and methods contemplated for use with any switching fabric, network element, or network based thereon.

In an exemplary embodiment, the node 700 includes common equipment 710, one or more line modules 720, and one or more switch modules 730. The common equipment 710 can include power; a control module; operations, administration, maintenance, and provisioning (OAM&P) access; user interface ports; and the like. The common equipment 710 can connect to a management system 750 through a data communication network 760 (as well as a Path Computation Element (PCE), Software Defined Network (SDN) controller, OpenFlow controller, etc.). The management system 750 can include a network management system (NMS), element management system (EMS), or the like. Additionally, the common equipment 710 can include a control plane processor, such as a controller 800 illustrated in FIG. 14, configured to operate the control plane as described herein. The node 700 can include an interface 770 for communicatively coupling the common equipment 710, the line modules 720, and the switch modules 730 therebetween. For example, the interface 770 can be a backplane, mid-plane, a bus, optical or electrical connectors, or the like. The line modules 720 are configured to provide ingress and egress to the switch modules 730 and to external connections on the links to/from the node 700. In an exemplary embodiment, the line modules 720 can form ingress and egress switches with the switch modules 730 as center stage switches for a three-stage switch, e.g. a three stage Clos switch. Other configurations and/or architectures are also contemplated. The line modules 720 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 720 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 720 can include wavelength division multiplexing interfaces, short reach interfaces, and the like, and can connect to other line modules 720 on remote network elements, end clients, edge routers, and the like, e.g. forming connections on the links in the network 100, 300, 400, 500, 600. From a logical perspective, the line modules 720 provide ingress and egress ports to the node 700, and each line module 720 can include one or more physical ports. The switch modules 730 are configured to switch channels, wavelengths, timeslots, tributary units, packets, etc. between the line modules 420. For example, the switch modules 730 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 730 can include Time Division Multiplexed (TDM) (i.e., circuit switching) and/or packet switching engines. The switch modules 730 can include redundancy as well, such as 1:1, 1:N, etc. In an exemplary embodiment, the switch modules 730 can provide wavelength switching such as through a Wavelength Selective Switch (WSS) or the like.

Those of ordinary skill in the art will recognize the node 700 can include other components which are omitted for illustration purposes, and that the systems and methods described herein is contemplated for use with a plurality of different network elements with the node 700 presented as an exemplary type of a network element. For example, in another exemplary embodiment, the node 700 may not include the switch modules 730, but rather have the corresponding functionality in the line modules 720 (or some equivalent) in a distributed fashion. For the node 700, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 700 is merely presented as one exemplary node 700 for the systems and methods described herein.

In an exemplary embodiment, the node 700 can be configured to perform a MBB method including, for a connection operating on a path in the network, determining a reserved connection on a new path, through the control plane, wherein the reserved connection has zero bandwidth; signaling the reserved connection on the new path; and creating the reserved connection in the control plane while suspending implementation in the data plane due to the zero bandwidth. The MBB method can further include releasing the connection on the path and modifying the reserved connection on the new path to establish the connection on the new path. The MBB method can further, responsive to a failure affecting the connection, releasing the connection on the path and modifying the reserved connection on the new path to switch the connection to the new path which is a protect path. Setting up a working path on any portion of the new path preempts the reserved connection. The reserved connection can be a Zero Bandwidth Subnetwork Connection (SNC) or an unconstrained Label Switched Path (LSP). The node 700 can utilize a unicast switch fabric that is unable to support broadcast and select. The connection can be a wavelength and the node 700 can be unable to support broadcast and select with the wavelength. The signaling the new path can support overbooking for the reserved connection and one or more additional reserved connections with a first connection of the reserved connection and the one or more additional reserved connection converting to active occupying the new path. The signaling the reserved connection can indicate a plurality of parameters including whether the reserved connection is blocking or non-blocking. The reserved connection can be blocking and preempt any existing reserved connections on the new path. The reserved connection can be non-blocking and can be crank-backed in the creating responsive to a blocking reserved connection on a portion or all of the new path.

Exemplary Controller

Figure 14:
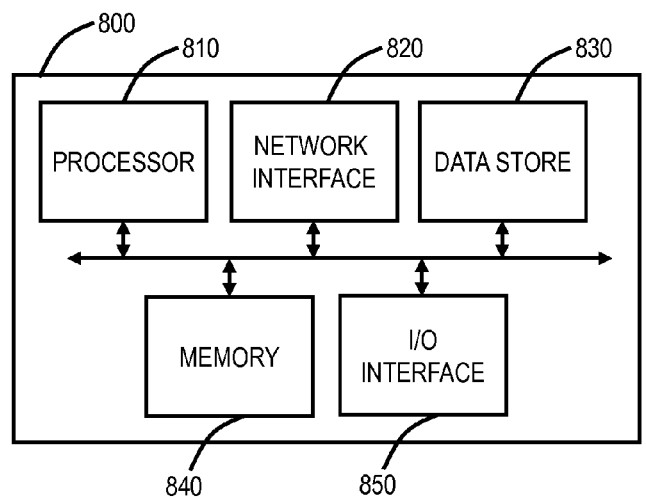
FIG. 14 is a block diagram of a controller to provide control plane processing and/or operations, administration, maintenance, and provisioning (OAM&P) for the node of FIG. 13.

Referring to FIG. 14, in an exemplary embodiment, a block diagram illustrates a controller 800 to provide control plane processing and/or operations, administration, maintenance, and provisioning (OAM&P) for the node 700. The controller 800 can be part of common equipment, such as common equipment 710 in the node 700, or a stand-alone device communicatively coupled to the node 700 via the DCN 760. The controller 800 can include a processor 810 which is hardware device for executing software instructions such as operating the control plane. The processor 810 can be any custom made or commercially available processor, a central processing unit (CPU), an auxiliary processor among several processors associated with the controller 800, a semiconductor-based microprocessor (in the form of a microchip or chip set), or generally any device for executing software instructions. When the controller 800 is in operation, the processor 810 is configured to execute software stored within memory, to communicate data to and from the memory, and to generally control operations of the controller 800 pursuant to the software instructions. The controller 800 can also include a network interface 820, a data store 830, memory 840, an Input/output (I/O) interface 850, and the like, all of which are communicatively coupled therebetween and with the processor 810.

The network interface 820 can be used to enable the controller 800 to communicate on the DCN 760, such as to communicate control plane information to other controllers, to the management system 750, and the like. The network interface 820 can include, for example, an Ethernet card (e.g., 10 BaseT, Fast Ethernet, Gigabit Ethernet) or a wireless local area network (WLAN) card (e.g., 802.11). The network interface 820 can include address, control, and/or data connections to enable appropriate communications on the network. The data store 830 can be used to store data, such as control plane information, provisioning data, OAM&P data, etc. The data store 830 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 830 can incorporate electronic, magnetic, optical, and/or other types of storage media. The memory 840 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 840 may incorporate electronic, magnetic, optical, and/or other types of storage media. Note that the memory 840 can have a distributed architecture, where various components are situated remotely from one another, but may be accessed by the processor 810. The I/O interface 850 includes components for the controller 800 to communicate to other devices. Further, the I/O interface 850 includes components for the controller 800 to communicate with the other nodes, such as using overhead associated with OTN signals.

In an exemplary embodiment, the controller 800 is configured to communicate with other controllers 800 in the network 100, 300, 400, 500, 600 to operate the control plane for control plane signaling. This communication may be either in-band or out-of-band. For SONET networks and similarly for SDH networks, the controllers 800 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 800 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 800 is configured to operate the control plane 140 in the network 100. That is, the controller 800 is configured to implement software, processes, algorithms, etc. that control configurable features of the network 100, 300, 400, 500, 600, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 800 can include a topology database that maintains the current topology of the network 100, 300, 400, 500, 600 based on control plane signaling (e.g., HELLO messages) and a connection database that maintains available bandwidth on the links again based on the control plane signaling. Again, the control plane is a distributed control plane; thus a plurality of the controllers 800 can act together to operate the control plane using the control plane signaling to maintain database synchronization. In source-based routing, the controller 800 at a source node for a connection is responsible for path computation and establishing by signaling other controllers 800 in the network 100, 300, 400, 500, 600. For example, the source node and its controller 800 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes from the originating node to the destination node based on a plurality of constraints such as administrative weights on the links, bandwidth availability on the links, etc.

In an exemplary embodiment, the controller 800 is configured to, for a connection operating on a path in the network, determine a reserved connection on a new path, through the control plane, wherein the reserved connection has zero bandwidth, signal the reserved connection on the new path, and cause creation of the reserved connection in the control plane while suspending implementation in the data plane due to the zero bandwidth. The controller is further configured to perform one of: responsive to a request, cause release of the connection on the path and modification of the reserved connection on the new path to establish the connection on the new path, or, responsive to a failure affecting the connection, cause release of the connection on the path and modification of the reserved connection on the new path to switch the connection to the new path which is a protect path. Setting up a working path on any portion of the new path preempts the reserved connection. The reserved connection can be one of a Zero Bandwidth Subnetwork Connection (SNC) and an unconstrained Label Switched Path (LSP). The connection can be a wavelength and the node can be unable to support broadcast and select with the wavelength. The new path can support overbooking for the reserved connection and one or more additional reserved connections with a first connection of the reserved connection and the one or more additional reserved connection converting to active occupying the new path. Signal of the reserved connection can indicate a plurality of parameters including whether the reserved connection is blocking or non-blocking.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Make-Before-Break (MBB) method, in a node operating in a network with a control plane, decoupling the control plane from a data plane, the MBB method comprising:
    for a connection operating on a path in the network, determining a reserved connection on a new path, through the control plane, wherein the reserved connection has zero bandwidth, and wherein the connection is provided via a unicast fabric in the data plane which does not support broadcast and select;
    signaling the reserved connection on the new path;
    creating the reserved connection in the control plane while suspending implementation in the data plane due to the zero bandwidth; and
    implementing the reserved connection on the new path by modifying the reserved connection to change the zero bandwidth subsequent to removal of the connection on the path to enable an MBB operation on the unicast fabric.

2. The MBB method of claim 1, wherein the implementing comprises
    releasing the connection on the path and modifying the reserved connection on the new path to establish the connection on the new path.

3. The MBB method of claim 1, wherein the implementing comprises
    responsive to a failure affecting the connection, releasing the connection on the path and modifying the reserved connection on the new path to switch the connection to the new path which is a protect path.

4. The MBB method of claim 1, wherein setting up a working path on any portion of the new path preempts the reserved connection.

5. The MBB method of claim 1, wherein the reserved connection is one of a Zero Bandwidth Subnetwork Connection (SNC) and/or an unconstrained Label Switched Path (LSP).

6. The MBB method of claim 1, wherein the signaling the new path supports overbooking for the reserved connection and one or more additional reserved connections with a first connection of the reserved connection and the one or more additional reserved connection converting to active occupying the new path.

7. The MBB method of claim 1, wherein the signaling the reserved connection indicates a plurality of parameters including whether the reserved connection is blocking or non-blocking.

8. The MBB method of claim 7, wherein the reserved connection is blocking and preempts any existing reserved connections on the new path.

9. The MBB method of claim 7, wherein the reserved connection is non-blocking and is crank-backed in the creating responsive to a blocking reserved connection on a portion or all of the new path.

10. A node, operating in a network with a control plane, configured to perform Make-Before-Break (MBB) where the control plane is decoupled from a data plane, the node comprising:
    one or more ports configured for switching between one another; and
    a controller communicatively coupled to the one or more ports, wherein the controller is configured to
        for a connection operating on a path in the network, determine a reserved connection on a new path, through the control plane, wherein the reserved connection has zero bandwidth, and wherein the connection is provided via a unicast fabric in the data plane which does not support broadcast and select, signal the reserved connection on the new path, cause creation of the reserved connection in the control plane while suspending implementation in the data plane due to the zero bandwidth, and implement the reserved connection on the new path by modification of the zero bandwidth on the reserved connection subsequent to removal of the connection on the path to enable an MBB operation on the unicast fabric.

11. The node of claim 10, wherein the controller is further configured to perform one of to implement the reserved connection:

responsive to a request, cause release of the connection on the path and modification of the reserved connection on the new path to establish the connection on the new path, or responsive to a failure affecting the connection, cause release of the connection on the path and modification of the reserved connection on the new path to switch the connection to the new path which is a protect path.

12. The node of claim 10, wherein setting up a working path on any portion of the new path preempts the reserved connection.

13. The node of claim 10, wherein the reserved connection is one of a Zero Bandwidth Subnetwork Connection (SNC) and/or an unconstrained Label Switched Path (LSP).

14. The node of claim 10, wherein the new path supports overbooking for the reserved connection and one or more additional reserved connections with a first connection of the reserved connection and the one or more additional reserved connection converting to active occupying the new path.

15. The node of claim 10, wherein the signal of the reserved connection indicates a plurality of parameters including whether the reserved connection is blocking or non-blocking.

16. A network configured to operate a control plane and configured to perform Make-Before-Break (MBB) where the control plane is decoupled from a data plane, the network comprising:

a plurality of nodes; and a plurality of links interconnecting the plurality of nodes;

wherein a plurality of calls are configured in the network, through the control plane, wherein a plurality of connections are provided via a unicast fabric in the data plane which does not support broadcast and select, wherein a plurality of reserved connections are configured in the network in the control plane, but not in the data plane since each of the plurality of reserved connections has zero bandwidth, and wherein to switch a call of the plurality of calls to an associated reserved connection, the call is released and the associated reserved connection is modified to change the zero bandwidth subsequent to removal of the plurality of connections to enable an MBB operation on the unicast fabric thereby implementing the associated reserved connection in the data plane.

\* \* \* \* \*